United States Patent [19]

Stoever et al.

[11] Patent Number: 5,077,935
[45] Date of Patent: Jan. 7, 1992

[54] MULCH COVER

[75] Inventors: Hermann Stoever; Alfons Meyer, both of Twistringen, Fed. Rep. of Germany

[73] Assignee: MST Draenbedarf GmbH, Twistringen, Fed. Rep. of Germany

[21] Appl. No.: 421,271

[22] Filed: Oct. 13, 1989

[30] Foreign Application Priority Data

Oct. 14, 1989 [DE] Fed. Rep. of Germany ....... 3835129

[51] Int. Cl.$^5$ .............................................. A01G 7/00
[52] U.S. Cl. ........................................ 47/9; 405/17; 428/198
[58] Field of Search ................... 47/9, 56; 405/17; 428/198

[56] References Cited

U.S. PATENT DOCUMENTS

| 1,890,906 | 12/1932 | Harney | 428/103 |
|---|---|---|---|
| 2,923,053 | 2/1960 | Allen | 47/56 |
| 4,283,880 | 4/1981 | Fieldsa | 47/9 |
| 4,518,280 | 5/1985 | Fletcher | 47/9 |
| 4,584,790 | 4/1986 | Gaughen | 47/56 |
| 4,910,052 | 3/1990 | Caldwell | 47/9 |

FOREIGN PATENT DOCUMENTS

| 2134306 | 2/1973 | Fed. Rep. of Germany | 47/56 |
|---|---|---|---|
| 2408518 | 9/1975 | Fed. Rep. of Germany | 47/56 |
| 2444436 | 3/1976 | Fed. Rep. of Germany | 47/56 |
| 3400696 | 7/1985 | Fed. Rep. of Germany | 47/56 |
| 612321 | 7/1979 | Switzerland | 47/9 |

Primary Examiner—Henry E. Raduazo
Attorney, Agent, or Firm—R. H. Siegemund

[57] ABSTRACT

A cover for covering cultures so as to improve soil conditions and plant growth includes a first, top layer of biological material such as straw, bark, peat, wood shavings, etc., a lower layer of UV-degradable synthetic material sewn to the first layer to thereby establish stitch holes which are water permeable, and another perforated layer of synthetic material e.g. a fleece is welded or bonded to said lowest layer, such that its perforations do not optically align with the stitch holes, but water can flow in between the two synthetic layers.

17 Claims, 1 Drawing Sheet

MULCH COVER

BACKGROUND OF THE INVENTION

The present invention relates to a cover, particularly a mulch cover for covering cultures so as to improve soil conditions and to enhance plant growth under utilization of biologically active as well as synthetic material.

New plants in horticultures including tree arboretums and other forrestry facilities, also including gardening parks etc. i.e. in all situations where an attempt is made to grow new plants. These plants are always subjected to a significant extent to various, even violent natural conditions, such as severe weather, unfavorable climate and so forth. Growth therefore will be detrimentally influenced through weeds, lack of moisture (or too much moisture), excessive or insufficient solar radiation etc.

Fighting weeds has been carried out in a chemical fashion which however from any point of view, "loads" the ecology and is frowned upon to an increasing extent. Therefore, it has been suggested to provide covers, for example for covering small plants but it was found that these covers for some reason extract nutrients from the soil. Thus in order to offset this detrimental side effect one has used twigs, straw, peat, bark, wood shavings or the like. All this has been carried out on an experimental basis in order to reduce the growth of competing weeds. Also, the germination conditions and local climate is to be improved while soil compaction is to be prevented i.e. the soil should always remain more or less loose and crumbly. In addition, new desired growth may require shading and finally air circulation and moisture conditions often require improvements of the local conditions in one form or another while particularly excessive dryness is to be avoided (at least in most instances). It is important to realize that the conditions are variable and difficult to generalization.

Any cover needed in that fashion is of course not a general one and requires variations which depend on the kind of growth that is to be enhanced on one hand and the kind of growth that is to be impeded on the other hand. In case of forrestry e.g. one expects the cover to remain useful through three of four vegetation periods. In gardening however one, or two at the most, may prove to be sufficient. Following the vegetation period it is expected that the material of which a cover is made has more or less rotted away and does not require any kind of removal. The mulch methods have established that straw is particularly good; it takes about 3 to 4 years before it is rotted without any residue that loads the environment. On the other hand it is a disadvantage that straw has to be more or less uniformly distributed e.g. the amount of 4 kg/m$^2$ but that is often difficult to obtain. On the other hand rotting of straw was found later on to particularly enhance the growth of weeds.

In order to offset the aforementioned problems foil mulching was introduced i.e. the soil was covered with a black foil which was light impermeable and thus prevents the germination of any weeds. This approach has the highly undesirable side effect in that the foil itself will not deteriorate and will have to be removed later. Moreover the supply of the desired plants which grow in between adjacent foils, with nutrients and fertilizer is no longer certain and may in fact become quite irregular. Also, rain water may in fact be completely deflected and run off from the growth area. Neither the feeding and supply of moisture is adequate.

In order to offset the aforementioned drawbacks without foregoing the respective advantages it was suggested to provide mulch covers in the form of mats or the like made of natural material. These mats were made of compacted or compressed straw. They lasted from 3-5 periods of vegetation and growth and still were rotting adequately but still there was certain amount of light permeability and the rotting as stated earlier still promoted the growth of weeds. Particular evil weeds such as thistles, certain grasses and others could not be avoided and wherever just little light passes through the mat the weeds will grow.

DESCRIPTION OF THE INVENTION

It is an object of the present invention to provide a new and improved mulch cover which meets all the requirements without incurring the drawbacks as listed. In particular the cover should be water permeable and permit the fertilization but prevents on the other hand the growth and germination of weeds. Moreover, the cover should decay naturally and enhance the growth of plants and should not only prevent the germination of weeds but provide also for heat or warmth retention as well as water retention in the soil underneath.

In accordance with the preferred embodiment of the present invention, the mulch cover to be used with advantage is to have a plurality of layers whereby biologically effective and synthetic materials alternate in the layering. The biological material is specifically selected towards enhancing the specific growth that is desired and should be placed on top so as to be exposed to moisture and to rot as fast as possible. The synthetic material on the other hand must be made water permeable to make sure that irrigation or rain will in fact pass through. Since the biologically effective materials is placed on top of the synthetic material the water will not run off but the biological fibrous material will prevent such a run off situation. Since water is passing through the layer assembly fertilizer will accordingly in the dissolved state pass through. This may be owing to the fact that the fertilizer itself comes in liquid form or it gets dissolved in rain or irrigation water.

Another advantage of the invention is to be seen in the simple fact that the layers of the cover are at first seen together. The stitching can be varied and can be distributed whereby, and that is important, the stitching holes provide directly for the passage of the thread holding the layers together while the very fact that the synthetic layer is perforated by the stitching provides for the moisture permeability. The number of stitches and/or distribution and/or density of the sewing perforations can be varied, but there should be plenty of them in order to make sure that moisture can indeed pass through but of course there may be variations simply for climatic and application (plant type) reasons.

It may be advisable to use the fact that there is a certain stoppage involved and selecting fewer stitches controls the water passage to avoid excessive moisture. On the other hand the thread being used may enhance or retard the passage of moisture through the respective apertures. The sewing has the further advantage that the cover itself is of a compact configuration, is stronger and can be more easily handled and more easily placed on the soil.

In certain cases one may want to cover certain barriers, ditches, slopes and embankments, bevels and other unevennesses. These local conditions can easily be accommodated through this mat owing to the fact that its components are held together and will not slide in relation to each other.

It was found however, that without further measures and depending on the conditions the little stitching holes may permit some light to pass through and that weeds may grow directly underneath. The fact is that after a while the whole mat is covered with weeds. In order to avoid this the lower foil layer that is sewn on, is in addition covered, either through a welded on or bonded on foil or fleece hot air welding was particularly advantageous. The tightness of the welding is not too important. The main aspect is that there is a connection made to the lowest sewn on foil covering the stitches which connection is made without the incurrence of stitching. Therefore a more or less closed synthetic dual layer assembly directly on top of the soil prevents light from passing through and, therefore, there will be no germination of weeds.

Of course the problem arises how to let water including the fertilizer through the lowest, added on foil layer. Therefore it is suggested to provide these bonded on or glued on supplemental layers also with small apertures, slits or holes but outside of the stepping apertures so that there is no optical alignment. Hence the bonding or other connecting (welding spots) should not cover the interface in a water impermeable fashion so that water once having seeped through the stitching holes can still pass through the supplemental now the lowermost layer but through the offset holes. Most importantly, there is no light that passes through.

In the case of a fleece, such a configuration is for practical purposes almost completely light impermeable but moisture permeable and porous so that the utilization of fleece made of synthetic material is really preferred. Moreover the fleece was found advantageous to use i.e. the fleece state could be used for biological layer as well as for the synthetic material since, the fleece is clearly light impermeable but moisture permeable so that if that is the case there is an inherent permeability by the material itself and that in turn means that the stitching is less important and a fewer number of stitches are needed and they can be fairly wide apart.

The decay and rotting of the mat and cover is controllable through choice of material. The biological material particularly can be matched to the vegetation periods; the foil on the other hand should be selected to rot by operation of solar, UV radiation. This is true of course also if a fleece is used. The upper layers of course decay faster than the lower ones so that at first the UV may not be very effective on the synthetic layer underneath the top biological layer, but as the latter decays under biological rotting conditions the foil underneath will be exposed increasingly to the UV radiation and will begin and continue to an increasing extent to decay. Depending on the thickness of the foil the decay and rotting times will last shorter or longer which in turn is factor in the lifetime of the cover. The cover generally speaking can be made of very thin material owing to the stitching and sewing together.

As stated the primary function of the synthetic layer and layers is to be light impermeable to thereby and therewith avoid germination and growth of weeds under the mat. This is a general case. However, there may be specific instances in which some light impermeability is required. In such instance then the foil must be made light transmissive.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
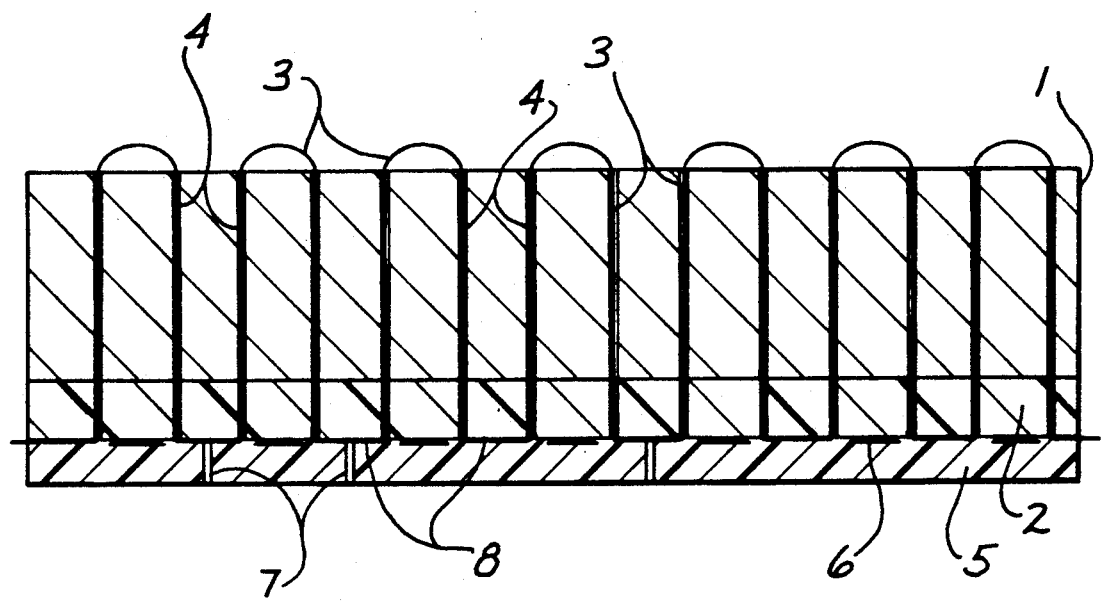
FIG. 1 holds a cross section through a typical basic 3-layer configuration in accordance with the preferred embodiment of the present invention for practicing the best mode thereof.

Proceeding now to the detailed description of the drawings, it was found that indeed a 3-layer configuration is the most practical and effective way of practicing the invention. The upper layer 1 is comprised of biological material e.g. cocos fibers, straw, bark or the like, examples of the materials that can be used have been mentioned earlier.

Underneath layer 1 is a second layer which is also the first synthetic layer 2 and is a foil or fleece made of a synthetic material and is in either case light impermeable. In the case of a fleece there is some inherent water permeability and of course layer 1 is water permeable. In the case of a synthetic foil, the foil 2 is by an in itself not water permeable. The two layers 1 and 2 are sewn together and, as schematically indicated, a thread 3 (there are of course many threads) holds the layers together in the field of view of this particular drawing.

Pursuant to the sewing process stitch holes 4, perforations or the like are produced basically by the sewing needle. The distance of the stitches from each other is of course determined by the sewing process while the size and diameter of each opening 4 is determined by the thickness of the needle that is used for sewing. Owing to the multiplicity of holes there is a certain decree of openness produced in the foil. With decreased spacing and increased diameter of each hole the permeability is increased. The thread 3 to some extent blocks each opening but the thread may well exhibit a considerable capillary effect so that in fact the openings 4 in spite of partial occupation of thread will be amenable to the transmission and flow of water.

Another synthetic layer 5 is either bonded in spots or welded in seams or spots to the layer 2. Layer 5, therefore, is not sewn on and is thus not provided with stitch holes. However, there are bonds 6 (weld spots, glue etc.) to bond layers 2 and 5 together. In fact to provide too much of a bonding by two excessive layers is not desirable since the space between the two foils or layers 2 and 5 should be available to flow through by water.

The layer or foil 5 is provided with individual slots or small apertures such as 7 which are not in alignment with any of the openings 4 of the stitching. Hence there is positively a blockage for the transmission of light from one side of the assembly to the other while clearly water permeability is provided for. Reference numeral 8 refers to unwelded or unbonded areas between layers 2 and 5 (no spots 6) through which water can flow from holes 4 to holes 7. The water will pass through the stitch hole 4, flow between layers 2 and 5 and drip through holes 7.

The mulch cover as illustrated constitutes the basic and most simple configuration but there may be more complex configuration provided for using a biological and synthetic material in alternating sequence. The various layers have to be all sewn together and the lowermost layer has to be made of synthetic material. On that material a further synthetic material layer or foil on fleece such as 5 is bonded or welded to so that now any light permeability made available by the stitched together assembly is impeded while water permeably is still provided for, through nonregistering openings in this lowermost layer just as openings bores, holes or slits 7 to make sure that water and fertilizer can pass through but no light.

The mats are preferably made in long webs or sheets and in such length so that when rolled up they assume a drum shaped configuration for ease of transport. The width is matched to the normal distance between plants and of course may vary from the kind of plant in accordance with the rows of planting. The sheets will be rolled in between the rows of plants and there may be cutouts and overlaps to accommodate the plants in the cutouts and to provide overlap for the adjacent sheets to make sure that the soil is fully covered. Of course there may be instances in which the sheets are too wide and there are simply cut slits into the mat laterally or cut away portions.

The invention is not limited to the embodiments described above but all changes and modifications thereof, not constituting departures from the spirit and scope of the invention, are intended to be included.

We claim:

1. Mulch cover for covering cultures so as to improve soil conditions and plant growth, the cover being comprised of biological and synthetic materials, the improvement comprising:
   a plurality of juxtaposed and superimposed layers including a first layer of biological, growth enhancing material and a second layer of synthetic material underneath the first layer;
   means for water permeably combining the layers of the plurality of layers including stitching means for sewing the first and second layers together; and
   a further layer of synthetic material underneath the second, synthetic layer and being bonded thereto said further layer being provided with small openings for water permeability, the openings not being aligned with openings in the second layer resulting from the stitching.

2. Cover as in claim 1 wherein said biological material is selected from the group of straw, bark, jute, cocos and other plant fibers.

3. Cover as in claim 1 wherein at least one of said synthetic materials is light impermeable.

4. Cover as in claim 1 wherein said synthetic material of the second layer is in a fleece state.

5. Cover as in claim 1 wherein said further layer is bonded to the second layer of synthetic material.

6. Cover as in claim 1 wherein said further layer is welded on to the second synthetic layer.

7. Cover as in claim 1 wherein said second layer is a light impermeable foil that is welded on or bonded on the further layer.

8. Cover as in claim 1, said further layer being a fleece which is water permeable and welded or bonded to said second layer.

9. A cover for covering cultures so as to improve soil conditions and plant growth comprising:
   a first, top layer of biologically active, growth enhancing material;
   a second layer of synthetic material underneath said biological layer;
   means for sewing said layers together; and
   a further layer of synthetic material welded or bonded to said second layer, having openings not aligned with stitching holes in the other layer, but water being permitted to seep through the layers of synthetic material, on account of the stitching and the openings.

10. Cover as in claim 9, wherein said biological material is selected from the group of straw, bark, jute, cocos and other plant fibers.

11. Cover as in claim 9, wherein said synthetic material is a synthetic light impermeable foil or foils.

12. Cover as in claim 9, wherein said synthetic material is in a fleece state.

13. Mulch cover for covering cultures so as to improve soil conditions and plant growth, the cover being comprised of biological and synthetic materials, the improvement comprising:
   a plurality of juxtaposed and superimposed layers including a first upper layer of biological material and a second layer of synthetic material, and being disposed underneath the first layer;
   means for water permeably combining the layers of the plurality of layers, including stitching means for sewing the two layers together; and
   a further layer of fleeced synthetic material being disposed underneath the second layer and being bonded thereto independently of said stitching means.

14. Cover as in claim 13 wherein said biological material is selected from the group of straw, bark, jute, cocos and other plant fibers.

15. Cover as in claim 13 wherein at least one of said synthetic material layers is a synthetic light impermeable foil.

16. Cover as in claim 13 wherein said further layer is adhesively bonded.

17. Cover as in claim 13 wherein said layer is welded on.

* * * * *